United States Patent
Yim et al.

(10) Patent No.: US 10,560,266 B2
(45) Date of Patent: Feb. 11, 2020

(54) MULTIPLE IDENTITY MANAGEMENT SYSTEM AND METHOD OF MANAGING MULTIPLE IDENTITIES USING THE SAME

(71) Applicant: NHN Entertainment Corporation, Seongnam-si (KR)

(72) Inventors: Yuik Yim, Seoul (KR); Cheolmin Ju, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 259 days.

(21) Appl. No.: 15/832,151

(22) Filed: Dec. 5, 2017

(65) Prior Publication Data
US 2018/0159687 A1    Jun. 7, 2018

(30) Foreign Application Priority Data

Dec. 7, 2016   (KR) .......................... 10-2016-0166036

(51) Int. Cl.
*H04L 9/32*        (2006.01)
(52) U.S. Cl.
CPC .................................. *H04L 9/3213* (2013.01)
(58) Field of Classification Search
None
See application file for complete search history.

(56) References Cited

U.S. PATENT DOCUMENTS

| | | | | |
|---|---|---|---|---|
| 9,137,131 B1 * | 9/2015 | Sarukkai | ............. | H04L 43/0876 |
| 9,998,453 B1 * | 6/2018 | Sharma | ............... | G06F 21/6245 |
| 2012/0260322 A1 * | 10/2012 | Logan | ..................... | G06F 21/33 726/6 |
| 2012/0278854 A1 * | 11/2012 | Ton | ..................... | H04L 63/0815 726/3 |

(Continued)

FOREIGN PATENT DOCUMENTS

| | | |
|---|---|---|
| JP | 2011-076430 | 4/2011 |
| KR | 10-2007-0072710 | 7/2007 |

(Continued)

OTHER PUBLICATIONS

Japanese Office Action dated Oct. 31, 2018, issued in Japanese Patent Application No. 2017-234032.

*Primary Examiner* — Henry Tsang
(74) *Attorney, Agent, or Firm* — H.C. Park & Associates, PLC (57) ABSTRACT

A system and method of managing multiple identities using a multiple identity management system includes receiving a user authentication signal from a user terminal, transmitting the user authentication signal to a first service server, the first service server matching the user authentication signal with a particular user ID associated with the first service server, receiving an authorization signal corresponding to the user authentication signal from the first service server, transmitting the authorization signal to the user terminal, receiving a request for validation of a user identification number corresponding to the authorization signal from a second (Continued)

service server, the second service server receiving the authorization signal transmitted via a user input from the user terminal, and transmitting the user identification number corresponding to the authorization signal to the second service server.

20 Claims, 5 Drawing Sheets

(56) References Cited

U.S. PATENT DOCUMENTS

| | | | | |
|---|---|---|---|---|
| 2013/0086657 A1* | 4/2013 | Srinivasan | .............. | H04L 63/10 |
| | | | | 726/6 |
| 2015/0249660 A1* | 9/2015 | Bailey | ..................... | G06F 21/41 |
| | | | | 726/8 |
| 2016/0028737 A1* | 1/2016 | Srinivasan | ......... | H04L 63/0807 |
| | | | | 726/1 |
| 2016/0065563 A1* | 3/2016 | Broadbent | ......... | H04L 63/0281 |
| | | | | 726/9 |

FOREIGN PATENT DOCUMENTS

| | | |
|---|---|---|
| KR | 10-2014-0025744 | 3/2014 |
| KR | 10-2014-0115660 | 10/2014 |

* cited by examiner

MULTIPLE IDENTITY MANAGEMENT SYSTEM AND METHOD OF MANAGING MULTIPLE IDENTITIES USING THE SAME

CROSS-REFERENCE TO RELATED APPLICATION

This application claims priority from and the benefit of Korean Patent Application No. 10-2016-0166036, filed on Dec. 7, 2016, which is hereby incorporated by reference for all purposes as if fully set forth herein.

BACKGROUND

Field

The invention relates generally to a multiple identity management system and method, and more particularly, to a multiple identity management system and method capable of providing more efficient and convenient electronic services by managing multiple identities based on user identification numbers.

Discussion of the Background

As mobile communication network and communication technology have developed, various electronic services based on wired and/or wireless communication network are being provided, such as social media and games. However, since user identification (ID) is managed separately by each of various services, there are problems such as inconvenience for the user and difficulty in linking various services with a given user in the conventional login method using the external authentication means (OAuth).

Particularly, in the mobile environment, since the membership process is considered to be barrier to entry for security purposes, a login method using external authentication means rather than a login method using ID and password of the service is widely used. However, even if the same user is logged in via the external authentication means, the user is treated as a different user by each of external authentication means, which makes it inconvenient for the user to use the service, difficult to link one user with multiple services, and can decrease the efficiency of the related computer networks and services.

The above information disclosed in this Background section is only for enhancement of understanding of the background of the inventive concepts and, therefore, it may contain information that does not constitute prior art.

SUMMARY

Multiple identities management systems and methods constructed according to the principles of the invention provide technological improvements capable of solving one or more of the aforementioned problems by managing multiple identities based on user identification numbers to improve consistency, efficiency and the user experience with a variety of electronic services associated with a given user.

Additional aspects will be set forth in part in the description which follows and, in part, will be apparent from the disclosure, or may be learned by practice of the inventive concepts.

According to one aspect of the invention, a multiple identity management system includes a communication unit to communicate with a user terminal, a first service server, and a second service server, and to receive data for integrating multiple identities using a user identification number, and a controller receiving an authorization signal for user authentication through communication with the first service server in response to a user authentication request from the user terminal, transmitting the authorization signal to the user terminal, receiving the authorization signal for user authentication from the second service server, receiving a user ID from the first service server, generating or verifying a user identification number, and transmitting the generated or verified user identification number to the second service server.

The controller may include a user authentication unit to receive an authorization signal for user authentication through communication with the first service server in response to a user authentication request from the user terminal, to transmit the authorization signal to the user terminal, to receive the authorization signal for user authentication from the second service server, to identify the authorization signal through communication with the first service server, and to perform a user verification, and an identification number authentication unit to receive a user ID from the first service server, to generate or verify a user identification number, and to transmit the verified user identification number to the second service server.

The system may further include a database to store a user identification number associated with multiple identities.

The authorization signal may include an access token.

According to another aspect of the invention, a method of managing multiple identities using a multiple identity management system includes receiving a user authentication signal from a user terminal, transmitting the user authentication signal to a first service server, the first service server matching the user authentication signal with a particular user ID associated with the first service server, receiving an authorization signal corresponding to the user authentication signal from the first service server, transmitting the authorization signal to the user terminal, receiving a request for validation of a user identification number corresponding to the authorization signal from a second service server, the second service server receiving the authorization signal transmitted via a user input from the user terminal, and transmitting the user identification number corresponding to the authorization signal to the second service server.

The step of transmitting the user identification number corresponding to the authorization signal to the second service server may further include requesting transmission of user information corresponding to the user identification number to the user terminal.

The step of transmitting the user identification number corresponding to the authorization signal to the second service server may include transmitting a validation request signal of the authorization signal to the first service server, receiving a first service user ID corresponding to the authorization signal from the first service server, identifying the user identification number corresponding to the first service user ID, and transmitting the identified user identification number to the second service server.

The step of transmitting the user identification number corresponding to the authorization signal to the second service server may include transmitting a validation request signal of the authorization signal to the first service server, receiving a first service user ID corresponding to the authorization signal from the first service server, generating the user identification number corresponding to the first service user ID, and transmitting the generated user identification number to the second service server.

The step of receiving a user authentication signal from a user terminal may include receiving a user authentication signal generated in response to a login request from an application installed in a user terminal, and the step of transmitting the user authentication signal to a first service server may include transmitting the user authentication signal to a first service server corresponding to the application.

The application may include one or more of Baidu, Xiaomi, Line, Line Play, Hangame, Google Plus, Facebook, Apple Game Center, Kakao, and Payco.

The second service server may include a game server.

The user terminal may include a smart phone, a mobile phone, a tablet, a computer, a notebook PC, and a game device.

The authorization signal may include an access token.

According to another aspect of the invention, a method of managing multiple identities using a multiple identity management system includes receiving a user authentication signal from a user terminal, transmitting the user authentication signal to a first service server, the first service server matching the user authentication signal with a particular ID associated with the first service server, receiving an authorization signal corresponding to the user authentication signal from the first service server, transmitting the authorization signal to the user terminal, receiving the authorization signal transmitted via a user input from the user terminal, transmitting an authorization signal validation signal to the first service server, receiving a first service user ID corresponding to the authorization signal from the first service server, and transmitting user information corresponding to the first service user ID to the user terminal.

The step of transmitting user information corresponding to the first service user ID to the user terminal may include identifying a user identification number corresponding to the first service user ID, and transmitting user information corresponding to the identified user identification number.

The step of transmitting user information corresponding to the first service user ID to the user terminal may include generating a user identification number corresponding to the first service user ID, and transmitting user information corresponding to the generated user identification number.

The step of receiving a user authentication signal from a user terminal may include receiving a user authentication signal generated in response to a login request from an application installed in a user terminal, and the step of transmitting the user authentication signal to a first service server may include transmitting the user authentication signal to a first service server corresponding to the application.

The application may include one or more Baidu, Xiaomi, Line, Line Play, Hangame, Google Plus, Facebook, Apple Game Center, Kakao, and Payco.

The multiple identity management system may include a game server.

The authorization signal may include an access token.

Exemplary implementations constructed according to the principles of the invention provide a number of technological improvements. For example, the multiple identities management system may be provided as a processor ("the multiple identities management processor"), the processor can provide the online service (e.g., online game service) with improved computer and/or network efficiency and a more convenient user experience by managing multiple identities based on unique user identification number.

For example, in exemplary implementations, it is possible to overcome the problems such as inconvenience to the user and difficulty in linking various services with a given user in the login method using the external authentication means (OAuth).

In addition, in exemplary implementations, it is possible to increases efficiency of computer resources and convenience for the user to use online services by managing multiple identities based on unique user identification number, thereby even if the user is logged in via a different external authentication means, the user is treated as a same user by the unique user identification number.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Exemplary embodiments of the invention will be described in detail with reference to the accompanying drawings. These exemplary embodiments will be described in detail for those skilled in the art in order to practice the invention. It should be appreciated that various exemplary embodiments of the invention are different but do not have to be exclusive. For example, specific shapes, configurations, and characteristics described in an exemplary embodiment of the invention may be implemented in another exemplary embodiment without departing from the spirit and the scope of the invention. In addition, it should be understood that position and arrangement of individual components in each disclosed exemplary embodiment may be changed without departing from the spirit and the scope of the invention. Therefore, a detailed description described below should not be construed as being restrictive. In addition, the scope of the invention is defined only by the accompanying claims and their equivalents if appropriate. Similar reference numerals will be used to describe the same or similar functions throughout the accompanying drawings. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

The terminology used herein is for the purpose of describing exemplary embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements and/or components, but do not preclude the presence or addition of one or more other features, integers, steps, operations, elements, components, and/or groups thereof.

It will be understood that when an element is referred to as being "connected to" another element, it can be directly connected to the other element, or intervening elements may be present.

In exemplary embodiments, multiple identity management system, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, multiple identity management system, and/or one or more components thereof may include or otherwise be associated with one or more memories (not shown) including code (e.g., instructions) configured to cause multiple identity management system, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Figure 1:
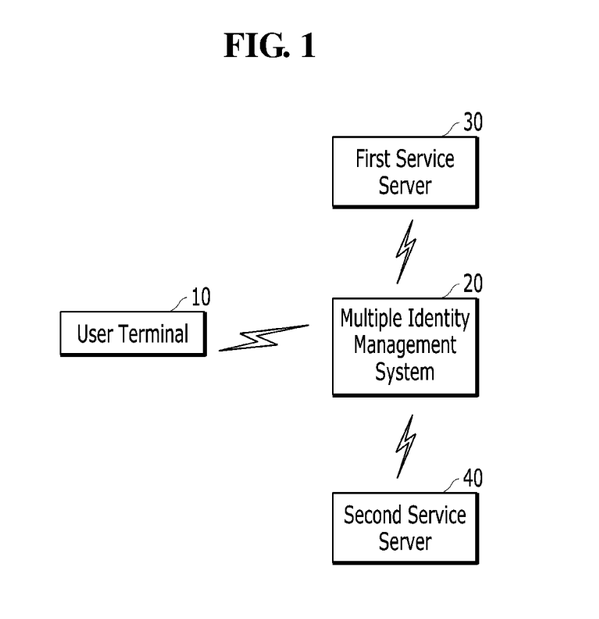
FIG. 1 is a diagram illustrating the relationship between a user terminal, a multiple identity management system, a first service server, and a second service server according to an exemplary embodiment constructed according to the principles of the invention.
Figure 2:
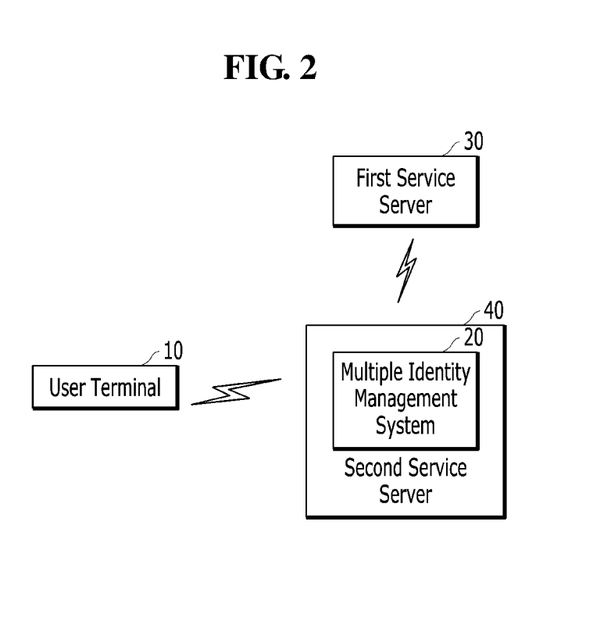
FIG. 2 is a diagram illustrating the relationship between a user terminal, a multiple identity management system, a first service server, and a second service server according to another exemplary embodiment of the invention.

FIG. 1 is a diagram illustrating the relationship between a user terminal, a multiple identity management system, a first service server, and a second service server according to an exemplary embodiment constructed according to the principles of the invention. FIG. 2 is a diagram illustrating the relationship between a user terminal, a multiple identity management system, a first service server, and a second service server according to another exemplary embodiment of the invention.

Referring to FIGS. 1 and 2, multiple identity management system 20 is connected to user terminal 10, first service server 30, and second service server 40 through a communication network, and transmits or receives all data to manage multiple identities using user identification numbers. The first and second service servers 30, 40 each may include one or more computers or computer networks through which access to an electronic service, such as social media, online gaming or other electronic service may be provided to users. The electronic services are typically provided by different entities.

Multiple identity management system 20 may be separate or part of second service server 40 as illustrated in FIG. 2. Multiple identity management system 20 and second service server 40 may be operated by the same operating entity.

User terminal 10 will be described as a mobile communication terminal connected to a communication network and capable of transmitting and receiving data. However, user terminal 10 is not limited to a mobile communication terminal, and may include any information communication device, a multimedia terminal, a wired/wireless terminal, a fixed type terminal, and an IP (Internet Protocol) terminal. In addition, user terminal 10 may include a mobile terminal having various communication specifications such as a mobile phone, a PMP (Portable Multimedia Player), a MID (Mobile Internet Device), a smart phone, a desktop, a tablet PC, a notebook PC, a netbook PC, a server, and an information communication device.

Various types of communication networks may be used for the communication network. For instance, wireless communication methods including a wireless LAN (WLAN), a Wi-Fi, a Wibro, a WiMAX and a High Speed Downlink Packet Access (HSDPA), or wired communication methods including Ethernet, xDSL (ADSL, VDSL), HFC (Hybrid Fiber Coax), FTTC (Fiber to the Curb) and FTTH (Fiber To The Home) may be used for the communication network. However, the communication network is not limited to the above-described communication methods, and may include all other widely known or later-developed communication methods in addition to the communication methods described above.

First service server 30 may be a server operated by a service provider for external authentication, and may include a server operated by an electronic service provider such as such as Baidu, Xiaomi, Line, Line Play, Hangame, Google Plus, Facebook, Apple Game Center, Kakao, and Payco. However, first service server 30 is not limited to the servers operated by the service providers listed above, and may include a server operated by any service provider used by users for external authentication.

Second service server 40 may be an electronic game server, and may include a server operated by a game provider such as Nexon, Hangame, EA Games, Blizzard, NCsoft. However, second service server 40 is not limited to a game server, and may include a server operated by any service provider who provides services that users log into via external authentication.

Figure 3:
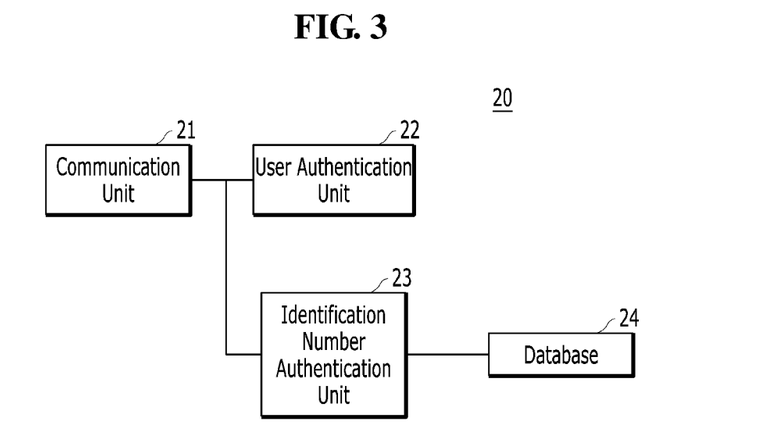
FIG. 3 is a block diagram illustrating a configuration of a multiple identity management system constructed according to an exemplary embodiment.

FIG. 3 is a block diagram illustrating a configuration of a multiple identity management system constructed according to an exemplary embodiment. Referring to FIG. 3, multiple identity management system 20 includes communication unit 21, user authentication unit 22, identification number authentication unit 23, and database 24.

Communication unit 21 performs the function of transmitting and receiving data between multiple identity management system 20 and user terminal 10, first service server 30 and second service server 40 via a communication network. Communication unit 21 may include RF transmitting means for up-converting and amplifying frequency of the transmitted signal and RF receiving means for low-noise amplifying the received signal and down-converting frequency of the received signal. Communication unit 15 may include one of a wireless communication module (not shown) and a wired communication module (not shown). A wireless communication module is configured to transmit and receive data according to a wireless communication method. When user terminal 10 uses wireless communication, a wireless communication module transmits and receives data to and from multiple identity management system 20 using one of a wireless network communication module, a wireless LAN communication module, and a wireless fan module. A wired communication module is for transmitting and receiving data via wired lines. A wired communication module is connected to a communication network via a wired line, and may transmit and receive data to and from multiple identity management system 20. In other words, user terminal 10 may transmit and receive data to and from multiple identity management system 20 via a communication network using a wireless communication module or a wired communication module. In particular, communication unit 21 according to the exemplary embodiments communicates with user terminal 10, first service server 30, and second service server 40, and transmits and receives data via a communication network for managing multiple identities using user identification numbers.

User authentication unit 22 receives an access token for user authentication through communication with first service server 30 in response to a user authentication request from user terminal 10 and transmits the access token to user terminal 10. In addition, user terminal 10 may transmit the access token to second service server 40 and then second service server may transmit the access token to multiple identity management system 20 for user authentication. When user authentication unit 22 receives the access token for user authentication from second service server 40, user authentication unit 22 identifies the access token and performs user verification through communication with first service server 30. For example, when there is a login request for external authentication from an application installed in user terminal 10, user authentication unit 22 communicates with corresponding first service server 30 to authenticate the user ID for each external authentication service. To this end, user authentication unit 22 may apply the SSO (Single Sign On) authentication scheme. Accordingly, embodiments of the invention may be applied to SSO in a mobile environment.

Identification number authentication unit 23 receives the user ID through communication with first service server 30 to generate or verify a user identification number and transmits the verified user identification number to second service server 40. Identification number authentication unit 23 identifies service identification information based on the user ID information authenticated by user authentication unit 22. In other words, when the user identification number corresponding to the user ID exists, identification number authentication unit 23 authenticates the corresponding user identification number. When the user identification number corresponding to the user ID does not exist, identification number authentication unit 23 generates a user identification number and transmits the user identification number to second service server 40. Also, when identification number authentication unit 23 transmits the user identification number to second service server 40, identification number authentication unit 23 may request to transmit the user information corresponding to the user identification number to user terminal 10. Accordingly, second service server 40 may receive the user identification number and transmit the corresponding user information to user terminal 10.

Database 24 stores a user identification number for authentication based on the user ID information in identification number authentication unit 23.

Figure 4:
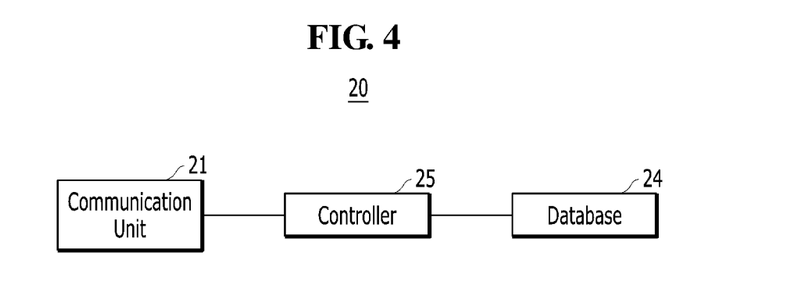
FIG. 4 is a block diagram illustrating a configuration of a multiple identity management system constructed according to another exemplary embodiment.

FIG. 4 is a block diagram illustrating a configuration of a multiple identity management constructed system according to another exemplary embodiment. Referring to FIG. 4, multiple identity management system 20 includes communication unit 21, controller 25, and database 24.

Communication unit 21 performs a function of transmitting and receiving data between multiple identity management system 20 and user terminal 10, first service server 30 and second service server 40 via a communication network.

Controller 25 receives an access token for user authentication through communication with first service server 30 in response to a user authentication request from user terminal 10 and transmits the access token to user terminal 10. Thereafter, when the access token for user authentication is received from second service server 40, controller 25 receives a user ID through communication with the first service server 30 to generate or identify a user identification number, and transmits the identified or generated user identification number to second service server 40. Also, when controller 25 transmits the user identification number to second service server 40, controller 25 may request to transmit the user information corresponding to the user identification number to user terminal 10. Accordingly, second service server 40 may receive the user identification number and transmit the corresponding user information to user terminal 10.

Database 24 stores a user identification number for authentication based on the user ID information in controller 25.

Multiple identity management system 20 may be implemented as one or more servers operating in a server-based computing-based manner or in a cloud-based manner. In particular, data for performing an integrated authentication process using a representative application through a cloud computing device may be provided through a cloud computing function that can be permanently stored in a cloud computing device on the internet. Here, cloud computing is a technology that utilizes internet technology in digital terminals, such as desktops, tablet computers, laptops, netbooks and smart phones to provide virtualized IT (Information Technology) resources such as hardware (server, storage, network, etc.), software (database, security, web server, etc.), service, and data, etc. on demand manner.

Figure 5:
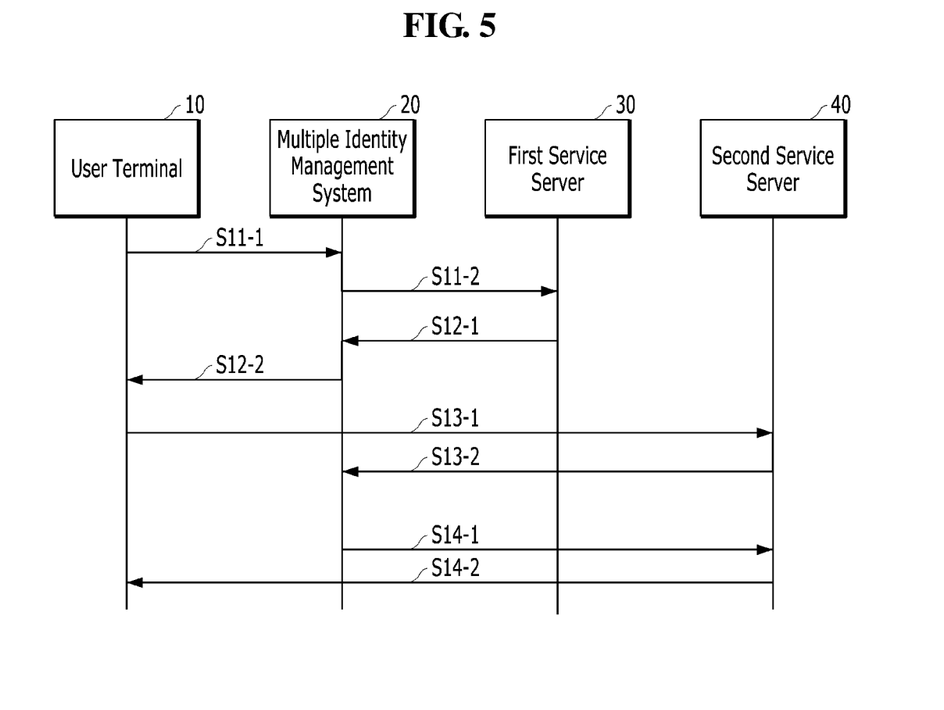
FIG. 5 is a flow chart illustrating an exemplary process of managing multiple identities according to the principles of the invention.
Figure 6:
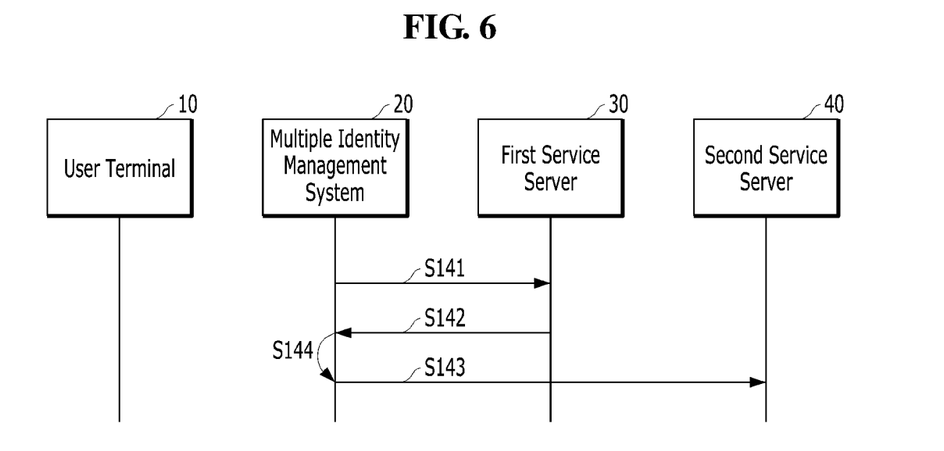
FIG. 6 is a flow chart illustrating part of a process of managing multiple identities of FIG. 5.
Figure 7:
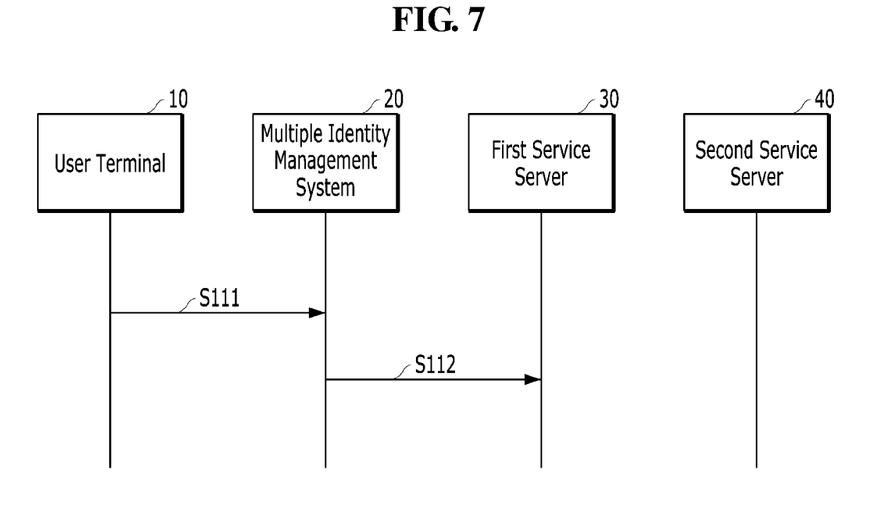
FIG. 7 is a flow chart illustrating another part of a process of managing multiple identities of FIG. 5.

FIG. 5 is a flow chart illustrating an exemplary process of managing multiple identities according to the principles of the invention. FIG. 6 is a flow chart illustrating part of a process of managing multiple identities of FIG. 5. FIG. 7 is a flow chart illustrating another part of a process of managing multiple identities of FIG. 5.

Referring to FIGS. 5, 6, and 7, to manage multiple identities according to an exemplary embodiment, user terminal 10 transmits a user authentication signal to multiple identity management system 20 at step S11-1, and multiple identity management system 20 transmits the received user authentication signal to first service server 30 matched with the user authentication signal at step S11-2.

In an exemplary embodiment, according to FIG. 7, the step of receiving the user authentication signal from user terminal 10 and transmitting the user authentication signal to first service server 30 matched with the user authentication signal may include receiving the user authentication signal generated in response to a login request from an application installed in user terminal 10 at step S111 and transmitting the user authentication signal to first service server 30 matched with the application at step S112.

Applications for the first service may include applications that provide electronic services such as Baidu, Xiaomi, Line, Line Play, Hangame, Google Plus, Facebook, Apple Game Center, Kakao, and Payco. However, an application is not limited to the applications that provide services listed above, and may include any electronic service that a user uses for external authentication.

In FIG. 5, at step S12-1, first service server 30 transmits an access token corresponding to the user authentication signal to multiple identity management system 20, and multiple identity management system 20 transmits the received access token to user terminal 10 at step S12-2.

At step S13-1, user terminal 10 transmits the received access token to second service server 40 through the user input, and second service server 40 transmits a signal for requesting the validation of the user identification number corresponding to the access token to multiple identity management system 20 at step S13-2.

At step S14-1, multiple identity management system 20 transmits the user identification number corresponding to the access token to second service server 40. Also, when multiple identity management system 20 transmits the user identification number to second service server 40, multiple identity management system 20 may request to transmit the user information corresponding to the user identification number to user terminal 10. Accordingly, second service server 40 transmits the user information corresponding to the user identification number to user terminal 10 at step S14-2.

In an exemplary embodiment, according to FIG. 6, the step of transmitting the user identification number corresponding to the access token from multiple identity management system 20 to second service server 40 may include transmitting an access token validation request signal from multiple identity management system 20 to the first service server 30 at step S141, receiving a first service user ID corresponding to the access token from first service server 30 at step S142, identifying a user identification number corresponding to the first service user ID at step S144 when the user identification number corresponding to the first service user ID exists, and transmitting the identified user identification number to the second service server 40 at step S143. As already explained above, at the time of transmitting the identified user identification number to second service server 40, multiple identity management system 20 may request to transmit the user information corresponding to the identified user identification number to user terminal 10. Accordingly second service server 40 may transmit the user information corresponding to the user identification number to user terminal 10.

Furthermore, in an exemplary embodiment, the step of transmitting the user identification number corresponding to the access token from multiple identity management system 20 to second service server 40 may include transmitting an access token validation request signal from multiple identity management system 20 to the first service server 30 at step S141, receiving a first service user ID corresponding to the access token from first service server 30 at step S142, generating a user identification number corresponding to the first service user ID at step S144 when the user identification number corresponding to the first service user ID does not exists, and transmitting the generated user identification number to the second service server 40 at step S143. In the same manner, at the time of transmitting the generated user identification number to second service server 40, multiple identity management system 20 may request to transmit the user information corresponding to the generated user identification number to user terminal 10. Accordingly second service server 40 may transmit the user information corresponding to the user identification number to user terminal 10.

Second service server 40 may be an electronic game server, and may include a server operated by a game provider such as Nexon, Hangame, EA Games, Blizzard, NCsoft. However, second service server 40 is not limited to a game server, and may include a server operated by any service provider who provides electronic services that users log into via external authentication.

For example, when a user wants to use the Facebook service as an external authentication means in user terminal 10 such as a smart phone to use a game service "New-Go-Stop" of the Hangame, a user authentication signal may be transmitted from the smart phone to multiple identity management system 20 in response to a login request of the Facebook in an application installed in the smart phone.

Multiple identity management system 20 transmits the received user authentication signal to first service server 30, which is the Facebook server, to request user authentication, and obtains an access token corresponding to the user authentication signal from the Facebook server. Multiple identity management system 20 transfers the obtained access token to the smart phone.

The smart phone transmits the received access token to second service server 40, which is the Hangame server, through the user input, and the Hangame server requests a user identification number to multiple identity management system 20.

Multiple identity management system 20 transfers the access token to the Facebook server, and the Facebook server transmits a Facebook ID corresponding to the access token to multiple identity management system 20.

Multiple identity management system 20 compares user ID numbers stored in the system with the Facebook ID. When there is a corresponding user identification number, multiple identity management system 20 stores the corresponding user identification number and transmits the corresponding user identification number to the Hangame server. When there is no corresponding user identification number, multiple identity management system 20 generates a user identification number and transmits the generated user identification number to the Hangame server.

The Hangame server identifies user information corresponding to the received user identification number, and transmits the user information such as score, item, and game list in progress of the user to the smart phone. The game service recognizes the user, who then can conveniently use a game service consistently and efficiently by utilizing the received information.

Then, when the same user wants to use the game service "New-Go-Stop" of the Hangame by using the Payco service as an external authentication means, similarly, a user authentication signal may be transmitted from the smart phone to multiple identity management system 20 in response to a login request of the Payco in an application installed in the smart phone.

Multiple identity management system 20 transmits the received user authentication signal to first service server 30, which is the Payco server, to request user authentication, and obtains an access token corresponding to the user authentication signal from the Payco server. Multiple identity management system 20 transfers the obtained access token to the smart phone.

The smart phone transmits the received access token to second service server 40, which is the Hangame server, through the user input, and the Hangame server requests a user identification number to multiple identity management system 20.

Multiple identity management system 20 transfers the access token to the Payco server, and the Payco server transmits a Payco ID corresponding to the access token to multiple identity management system 20.

Multiple identity management system 20, when the user uses the Payco ID as the external authentication means for the first time, matches Payco ID with the user identification number identified or generated previously using the Facebook ID as the external authentication means, and transmits the matched user identification number to the Hangame server.

The Hangame server identifies user information corresponding to the received user identification number, and transmits the user information such as score, item, and game list in progress of the user to the smart phone. The game service recognizes the user, who then can conveniently use a game service consistently and efficiently by utilizing the received information.

Accordingly, multiple identity management system 20 manages identities based on a user identification number to provide an efficient and consistent service even when a user uses different external authentication means.

Figure 8:
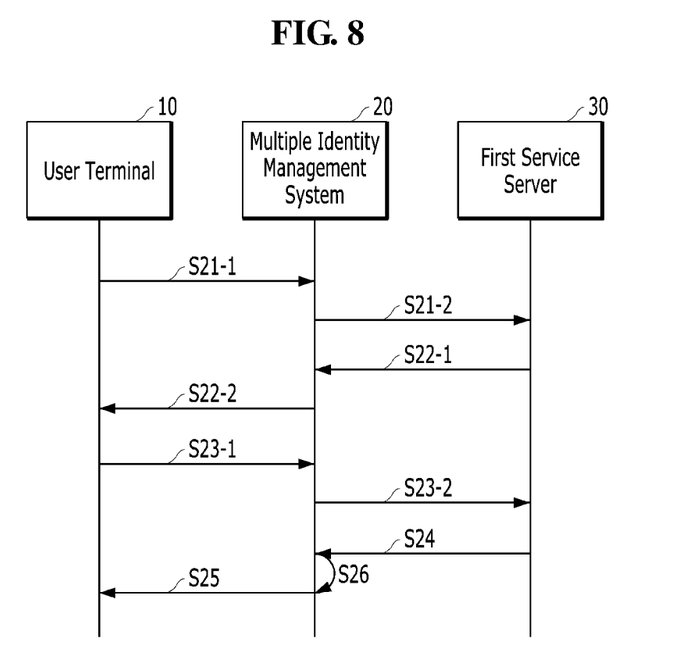
FIG. 8 is a flow chart illustrating another exemplary process of managing multiple identities according to the principles of the invention.
Figure 9:
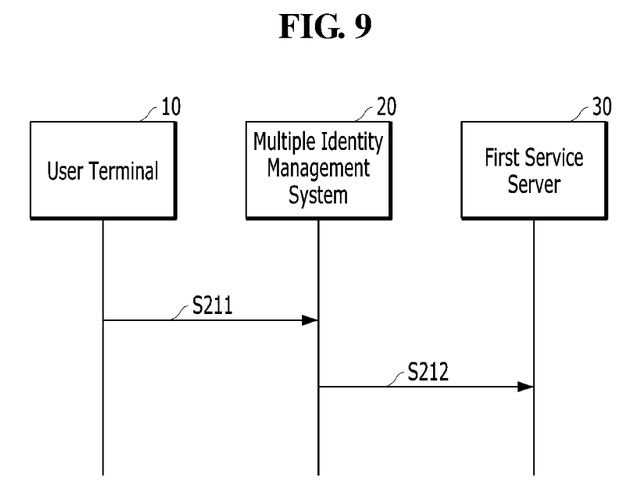
FIG. 9 is a flow chart illustrating part of a process of managing multiple identities of FIG. 8.

FIG. 8 is a flow chart illustrating another exemplary process of managing multiple identities according to the principles of the invention. FIG. 9 is a flow chart illustrating part of a process of managing multiple identities of FIG. 5. In another embodiment of the invention, multiple identity management system 20 may be part of second service server 40 of FIGS. 5 to 7. That is, multiple identity management system 20 and second service server 40 can be operated by the same operating entity.

Referring to FIGS. 8 and 9, to manage multiple identities according to exemplary embodiments of the invention, user terminal 10 transmits a user authentication signal to multiple identity management system 20 at step S21-1, and multiple identity management system 20 transmits the received user authentication signal to first service server 30 matched with the user authentication signal at step S21-2.

In another exemplary embodiment, according to FIG. 9, the step of receiving the user authentication signal from user terminal 10 and transmitting the user authentication signal to first service server 30 matched with the user authentication signal may include receiving the user authentication signal generated in response to a login request from an application installed in user terminal 10 at step S211 and transmitting the user authentication signal to first service server 30 matched with the application at step S212.

Applications for the first service may include applications that provide electronic services such as Baidu, Xiaomi, Line, Line Play, Hangame, Google Plus, Facebook, Apple Game Center, Kakao, and Payco. However, an application is not limited to the applications that provide services listed above, and may include any electronic services that a user uses for external authentication.

In FIG. 8, at step S22-1, first service server 30 transmits an access token corresponding to the user authentication signal to multiple identity management system 20, and multiple identity management system 20 transmits the received access token to user terminal 10 at step S22-2.

At step S23-1, user terminal 10 transmits the received access token to multiple identity management system 20 through the user input, and multiple identity management system 20 transmits an access token validation request signal to first service server 30 at step S23-2.

At step S24, multiple identity management system 20 receives a first service user ID corresponding to the access token from first service server 30. At step S26, multiple identity management system 20 identifies or generates a user identification number corresponding to the first service user ID. At step S25, multiple identity management system 20 transmits the user information corresponding to the first service user ID to user terminal 10.

Multiple identity management system 20 may exist as part of an electronic game server. For example, it may be part of a server operated by a game provider such as Nexon, Hangame, EA Games, Blizzard, NCsoft. That is, multiple identity management system 20 and the game server may be operated by the same operating entity. However, the game server may include a server operated by any service provider who provides electronic services that users log into via external authentication.

According to the exemplary embodiments as described above, multiple identity management system manages identities based on a user identification number to improve consistency, efficiency and the user experience with a variety of electronic services associated with a given user, even when a user uses different external authentication means. In addition, a user can be given various options for authentication means, and the risk of loss of a user identity due to the change of the authentication means can be minimized.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements.

What is claimed is:

1. A multiple identity management system comprising:
a communication unit to communicate with a user terminal, a first service server, and a second service server, and to receive data for authenticating multiple identities using a user identification number; and
a controller to receive an authorization signal for user authentication through communication with the first service server in response to a user authentication request from the user terminal, to transmit the authorization signal to the user terminal, to receive the authorization signal for user authentication from the second service server, to receive a user ID from the first service server, to generate or verify a user identification number, and to transmit the generated or verified user identification number to the second service server.

2. The system of claim 1, wherein the controller comprises:
a user authentication unit to receive an authorization signal for user authentication through communication with the first service server in response to a user authentication request from the user terminal, to transmit the authorization signal to the user terminal, to receive the authorization signal for user authentication from the second service server, to identify the authorization signal through communication with the first service server, and to perform a user verification; and
an identification number authentication unit to receive a user ID from the first service server, to generate or verify a user identification number, and to transmit the generated or verified user identification number to the second service server.

3. The system of claim 1, further comprising a database to store a user identification number associated with multiple identities.

4. The system of claim 1, wherein the authorization signal comprises an access token.

5. A method of managing multiple identities using a multiple identity management system, the method comprising:
receiving a user authentication signal from a user terminal;
transmitting the user authentication signal to a first service server, the first service server matching the user authentication signal with a particular user ID associated with the first service server;
receiving an authorization signal corresponding to the user authentication signal from the first service server;
transmitting the authorization signal to the user terminal;
receiving a request for validation of a user identification number corresponding to the authorization signal from a second service server, the second service server receiving the authorization signal transmitted via a user input from the user terminal; and
transmitting the user identification number corresponding to the authorization signal to the second service server.

6. The method of claim 5, wherein the step of transmitting the user identification number corresponding to the authorization signal to the second service server further comprises requesting transmission of user information corresponding to the user identification number to the user terminal.

7. The method of claim 5, wherein the step of transmitting the user identification number corresponding to the authorization signal to the second service server comprises:
transmitting a validation request signal for the authorization signal to the first service server;
receiving a first service user ID corresponding to the authorization signal from the first service server;
identifying the user identification number corresponding to the first service user ID; and
transmitting the identified user identification number to the second service server.

8. The method of claim 5, wherein the step of transmitting the user identification number corresponding to the authorization signal to the second service server comprises:
transmitting a validation request signal for the authorization signal to the first service server;
receiving a first service user ID corresponding to the authorization signal from the first service server;
generating the user identification number corresponding to the first service user ID; and
transmitting the generated user identification number to the second service server.

9. The method of claim 5, wherein:
the step of receiving a user authentication signal from a user terminal comprises receiving a user authentication signal generated in response to a login request from an application installed in a user terminal; and
the step of transmitting the user authentication signal to a first service server comprises transmitting the user authentication signal to a first service server corresponding to the application.

10. The method of claim 9, wherein the application comprises one or more of Baidu, Xiaomi, Line, Line Play, Hangame, Google Plus, Facebook, Apple Game Center, Kakao, and Payco.

11. The method of claim 5, wherein the second service server comprises a game server.

12. The method of claim 5, wherein the user terminal comprises a smart phone, a mobile phone, a tablet, a computer, a notebook PC, and a game device.

13. The method of claim 5, wherein the authorization signal comprises an access token.

14. A method of managing multiple identities using a multiple identity management system, the method comprising:
receiving a user authentication signal from a user terminal;
transmitting the user authentication signal to a first service server, the first service server matching the user authentication signal with a particular user ID associated with the first service server;
receiving an authorization signal corresponding to the user authentication signal from the first service server;
transmitting the authorization signal to the user terminal;
receiving the authorization signal transmitted via a user input from the user terminal;
transmitting an authorization signal validation signal to the first service server;
receiving a first service user ID corresponding to the authorization signal from the first service server; and
transmitting user information corresponding to the first service user ID to the user terminal.

15. The method of claim 14, wherein the step of transmitting user information corresponding to the first service user ID to the user terminal comprises:
identifying a user identification number corresponding to the first service user ID; and
transmitting user information corresponding to the identified user identification number.

16. The method of claim 14, wherein the step of transmitting user information corresponding to the first service user ID to the user terminal comprises:
generating a user identification number corresponding to the first service user ID; and
transmitting user information corresponding to the generated user identification number.

17. The method of claim 14, wherein:
the step of receiving a user authentication signal from a user terminal comprises receiving a user authentication signal generated in response to a login request from an application installed in a user terminal; and
the step of transmitting the user authentication signal to a first service server comprises transmitting the user authentication signal to a first service server corresponding to the application.

18. The method of claim 17, wherein the application comprises one or more of Baidu, Xiaomi, Line, Line Play, Hangame, Google Plus, Facebook, Apple Game Center, Kakao, and Payco.

19. The method of claim 14, wherein the multiple identity management system comprises a game server.

20. The method of claim 14, wherein the authorization signal comprises an access token.

\* \* \* \* \*